United States Patent [19]
Kinoshita et al.

[11] Patent Number: 6,067,950
[45] Date of Patent: May 30, 2000

[54] TWO-CYCLE ENGINE AND PERSONAL WATERCRAFT HAVING IT MOUNTED THEREON

[75] Inventors: Masato Kinoshita, Kakogawa; Yoshinobu Tanaka, Hyogo-Ken, both of Japan

[73] Assignee: Kawasaki Jukogyo Kabushiki Kaisha, Kobe, Japan

[21] Appl. No.: 08/946,837

[22] Filed: Oct. 8, 1997

[30]     Foreign Application Priority Data

Oct. 29, 1996  [JP]  Japan .................................. 8-304074

[51] Int. Cl.[7] .................................................. F16F 15/26
[52] U.S. Cl. ......................................................... 123/192.2
[58] Field of Search ............................................ 123/192.2

[56]             References Cited
             U.S. PATENT DOCUMENTS

| | | | |
|---|---|---|---|
| 3,903,995 | 9/1975 | Irgens ................................... | 123/192.2 |
| 4,028,963 | 6/1977 | Nakamura et al. .................. | 123/192.2 |
| 4,195,613 | 4/1980 | Bratt et al. ............................ | 123/192.2 |
| 4,311,120 | 1/1982 | Freyn et al. ......................... | 123/192.2 |
| 4,545,341 | 10/1985 | Corey et al. ......................... | 123/192.2 |
| 5,118,978 | 6/1992 | Matsumoto et al. ................ | 123/149 D |
| 5,406,916 | 4/1995 | Rodrigues ............................ | 123/18 A |
| 5,542,387 | 8/1996 | Okubo ................................... | 123/192.2 |

FOREIGN PATENT DOCUMENTS

| | | |
|---|---|---|
| 60-137171 | 9/1985 | Japan . |
| 1-134757 | 9/1989 | Japan . |
| 3-130530 | 6/1991 | Japan . |
| 4-331842 | 11/1992 | Japan . |
| 7-293266 | 11/1995 | Japan . |

Primary Examiner—Noah P. Kamen
Assistant Examiner—Jason Benton
Attorney, Agent, or Firm—Oliff & Berridge, PLC

[57]             ABSTRACT

A two-cycle engine includes a crank case, a crank shaft carried by the crank case, intake reed valves attached to the crank case, a plurality of balance weights rotating in association with the crank shaft and a plurality of balance rotating shafts bearing the balance weights. In arrangement, the balance weights and the balance rotating shafts are arranged outside the outermost intake reed valves in the axial direction of the crank shaft. In view of the axial direction of the crank shaft, the rotating axes of the balance weights and the center portions of the intake reed valves are arranged on opposing parting planes of the crank case. Thus, it is possible to miniaturize the size of the engine in view of the axial direction. Further, the balance weights can be carried by the balance rotating shafts without being lengthened.

12 Claims, 6 Drawing Sheets

TWO-CYCLE ENGINE AND PERSONAL WATERCRAFT HAVING IT MOUNTED THEREON

BACKGROUND OF THE INVENTION

The present invention relates to a two-cycle engine and a personal watercraft equipped with the two-cycle engine.

Figure 1:
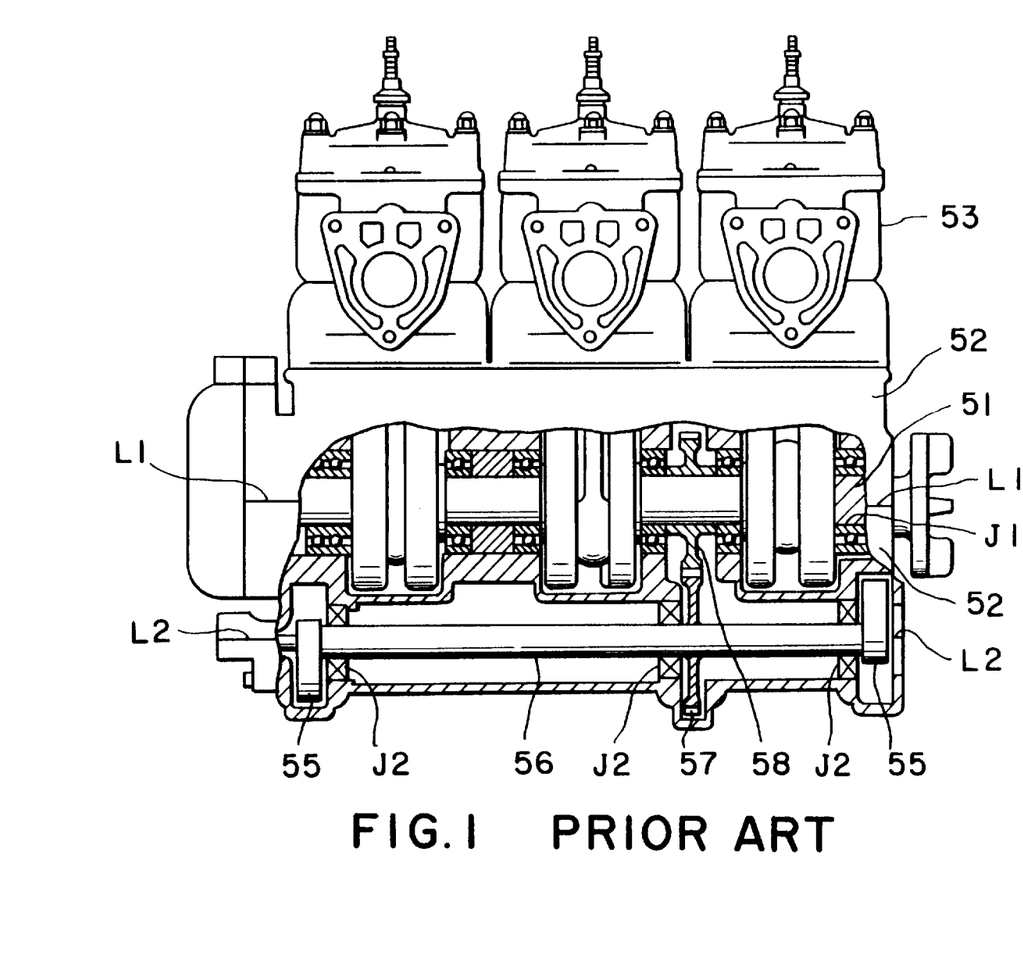
FIG. 1 is a partial and longitudinal cross-sectional view of a conventional three-cylinder and two-cycle engine.
Figure 2:
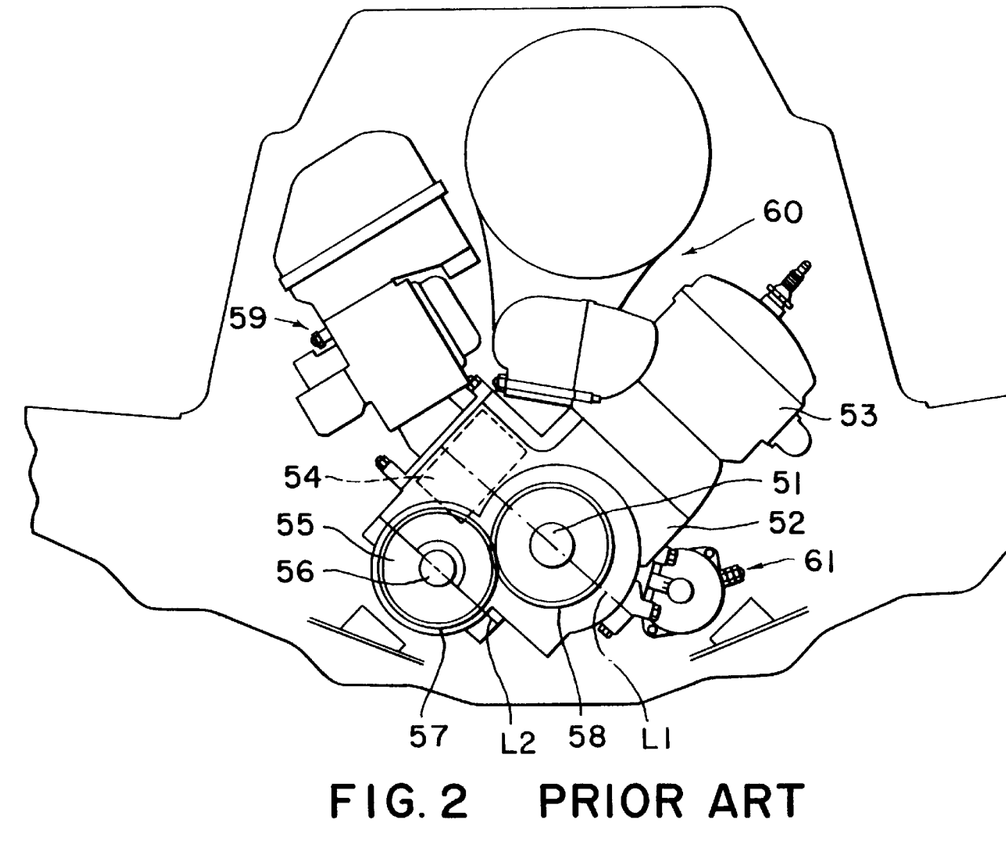
FIG. 2 is a schematic front view of a personal watercraft, showing an arrangement of the crank shaft and the balance shaft in the conventional two-cycle engine mounted thereon.

In the prior art, there is a known two-cycle engine as shown in FIGS. 1 and 2. In the figures, FIG. 1 is a partial cross sectional view of the two-cycle and three-cylinder engine. FIG. 2 is a front view of a personal watercraft having the two-cycle and three-cylinder engine mounted on board.

The two-cycle engine of FIG. 2 comprises a crank case 52, a crank shaft 51 to which not-shown pistons are linked and which is rotatably supported by the crank case 52 through bearings J1 (FIG. 1) disposed on a first parting planes L1 of the crank case 52 and three cylinders 53 mounted on the crank case 52. In the crank case 52, the two-cycle engine further includes three intake reed valves 54 juxtaposed in the axial direction of the crank shaft 51, corresponding to the three cylinders, respectively.

As shown in FIG. 1, the two-cycle engine is provided with two balance weights 55 for reducing vibrations caused by reciprocating motion of the pistons. The balance weights 55 are fixed on both ends of a balance rotating shaft 56. The balance rotating shaft 56 is provided, at a substantially intermediate portion thereof, with a driven gear 57 and rotatably supported by the crank case 52 through bearings J2 disposed on a second parting planes L2 of the crank case 52. In operation, the balance rotating shaft 56 is rotated by the crank shaft 51 through a drive gear 58 secured thereon so as to mesh with the driven gear 57. The two-cycle engine further includes an intake-air induction unit 59 containing a carburetor, an exhaust-gas discharging unit 60 containing a muffler, and a starter 61.

Generally, in case of a multi-cylindered engine, a plurality of balance weights have to be arranged apart from each other in the axial direction. From this point of view, the plural balance weights 55 are mounted on the single balance rotating shaft 56 in the above-mentioned conventional two-cycle engine for the personal watercraft.

However, it should be noted that such an arrangement of the weights causes the balance rotating shaft to be lengthened and, the balance rotating shaft should be arranged at a position that is in a circumferential area around the crank shaft and does not interfere with the intake reed valves, the starter or the like.

Consequently, in view of the axial direction of the crank shaft 51, the balance weights 55 are arranged to project radially in circumferentially different positions from the intake reed valves 54 and the starter 61 etc., which arrangement is far from the miniaturization of the engine.

Note, U.S. Pat. No. 3,903,995 discloses a single cylinder engine having two balance rotating shafts, each of which has a single balance weight mounted thereon. However, since the respective balance rotating shafts are so long as to extend from the vicinity of the end of the crank shaft to the radial outside of a crank web, the total length of both balance rotating shafts exceeds to that of the above engine having the single balance rotating shaft.

Again in the two-cycle engine of FIG. 2, the intake reed valves 54 are disposed on the first parting surface 54 running on the axis of the crank shaft 51, while the balance rotating shaft 56 has an axis arranged on the second parting planes L2 of the crank case 52. Thus, since the crank case 52 is divided into three pieces by two pairs of parting planes L1, L2, the structure of the crank case 51 is complicated thereby to increase the manufacturing cost.

SUMMARY OF THE INVENTION

Accordingly, it is therefore an object of the present invention to provide a two-cycle engine which dispenses with such a long balance rotating shaft and has a high degree of freedom in arranging balance weights in the engine thereby enabling the miniaturization, and which has a simplified crank case.

It is an additional object of the present invention to provide a personal watercraft having the two-cycle engine on board.

The object of the present invention described above can be accomplished by a two-cycle engine comprising:

a crank case;

a crank shaft carried by the crank case so as to rotate therein;

an intake reed valve attached to the crank case;

a balance weight adapted so as to rotate in association with the crank shaft; and a balance rotating shaft bearing the balance weight;

wherein the balance weight and the balance rotating shaft are arranged apart from the intake reed valve in the axial direction of the crank shaft.

With the arrangement mentioned above, since the balance weight is arranged so as to overlap with the intake reed valve in view of the axial direction of the crank shaft, it is possible to miniaturize the size of the engine in view of the axial direction. Further, since the balance rotating shaft is arranged outside the intake reed valve, the balance weight can be carried by the balance rotating shaft without being lengthened.

In the present invention, preferably, the two-cycle engine further comprises a plurality of cylinders and the intake reed valves are juxtaposed in the axial direction of the crank shaft in correspondence with the cylinders respectively, and the balance weights are arranged outside the intake reed valves on both sides of the crank case in the axial direction of the crank shaft.

Also in this case, it is possible to miniaturize the size of the engine in view of the axial direction, in spite of the plural cylinders and the plural balance weights.

Preferably, the intake reed valves are arranged at the interior of the crank case, and both substantial center portions of the intake reed valves viewed in the axial direction of the crank shaft and rotating centers of the balance weights are arranged on opposing parting planes of the crank case, on which the crank shaft is disposed.

With the above-mentioned arrangement, owing to the single pair of the parting planes of the crank case, the structure of the crank case can be simplified.

More preferably, a plurality of balance weights are arranged, along the parting planes of the crank case, in different positions from each other in the radial direction of the crank shaft.

According to the above arrangement, it is not only possible to simplify the structure of the crank case due to the parting planes but to establish the positions of the balance weights appropriately in correspondence with diameters of balance drive gears or driven gears.

In the present invention, preferably, the two-cycle engine further comprises a boss attached to the crank shaft for carrying a rotor of a generator and the boss is provided with a drive gear for driving one of the balance weights.

With the arrangement, since the boss is integrated with the balance drive gears, it is possible to reduce the number of parts, whereby the cost reduction for the engine can be realized.

According to the present invention, there is further provided a two-cycle engine comprising:

a crank case;

a crank shaft carried by the crank case;

an intake reed valve attached to the crank case;

a starter arranged, about an axis of the crank shaft, in a different position from the intake reed valve;

first and second balance weights adapted so as to rotate in association with the crank shaft; and first and second balance rotating shafts for bearing the first and second balance weights, respectively;

wherein the first balance weight and the first balance rotating shaft are arranged apart from the intake reed valves in the axial direction of the crank shaft; and the second balance weight and the second balance rotating shaft are arranged apart from the starter in the axial direction of the crank shaft.

With the above-mentioned arrangement, since the first balance weight and the first balance rotating shaft are arranged so as to overlap with the intake reed valves while the second balance weight and the second balance rotating shaft are arranged so as to overlap with the starting motor in view of the axial direction of the crank shaft, it is possible to miniaturize the size of the engine in view of the axial direction and shorten the first and second balance rotating shafts.

Also in the above two-cycle engine, it is preferable that the engine further comprises a boss attached to the crank shaft for carrying a rotor of a generator and the boss is provided with a drive gear for driving one of the balance weights.

With the arrangement, since the boss is integrated with the balance drive gears, it is possible to reduce the number of parts, whereby the cost reduction for the engine can be realized.

According to the present invention, there is also provided a personal watercraft comprising:

a hull; and a two-cycle engine installed in the hull;

wherein the two-cycle engine including:

a crank case;

a crank shaft carried by the crank case;

an intake reed valve attached to the crank case;

a balance weight adapted so as to rotate in association with the crank shaft;

a balance rotating shaft bearing the balance weight;

cylinders mounted on the crank case so as to extend from an axis of the crank shaft obliquely upward on one lateral side of the crank shaft in view of the axial direction; and an intake air induction unit arranged so as to extend from the axis of the crank shaft obliquely upward on the other lateral side of the crank shaft in view of the axial direction, together with the intake reed valves;

wherein the balance weights and the balance rotating shaft are arranged apart from the intake reed valves in the axial direction of the crank shaft.

In this case, since the cylinders and the intake reed valves and the intake air induction unit are arranged in a V-shaped manner in view of the axial direction of the crank shaft, the engine can be compactly accommodated inside the personal watercraft having a V-shaped bottom generally.

In the present invention, preferably, the two-cycle engine of the above-mentioned watercraft further includes a boss attached to the crank shaft for carrying a rotor of a generator, the boss being provided with a drive gear for driving the balance weight.

Also in this case, since the boss is integrated with the balance drive gears, it is possible to reduce the number of parts, whereby the cost reduction for the engine can be realized.

According to the present invention, there is also provided a personal watercraft comprising:

a hull; and a two-cycle engine installed in the hull;

wherein the two-cycle engine including:

a crank case;

a crank shaft carried by the crank case;

an intake reed valve attached to the crank case;

a starter arranged, about an axis of the crank shaft, in a different position from the intake reed valve;

first and second balance weights adapted so as to rotate in association with the crank shaft; and first and second balance rotating shafts for bearing the first and second balance weights, respectively;

cylinders mounted on the crank case so as to extend from an axis of the crank shaft obliquely upward on one lateral side of the crank shaft in view of the axial direction; and an intake air induction unit arranged so as to extend from the axis of the crank shaft obliquely upward on the other lateral side of the crank shaft in view of the axial direction, together with the intake reed valves;

wherein the first balance weight and the first balance rotating shaft are arranged apart from the intake reed valve in the axial direction of the crank shaft;

the second balance weight and the second balance rotating shaft are arranged apart from the starter in the axial direction of the crank shaft; and the starter is arranged on the one lateral side of the crank shaft in view of the axial direction.

In this case, since the cylinders and the intake reed valves and the intake air induction unit are arranged in a V-shaped manner in view of the axial direction of the crank shaft and the starter is arranged on the one lateral side of the crank shaft, the engine including the starter can be compactly accommodated inside the personal watercraft having a V-shaped bottom generally.

In the present invention, preferably, the two-cycle engine of the above-mentioned watercraft further includes a boss attached to the crank shaft for carrying a rotor of a generator, the boss being provided with a drive gear for driving the balance weight.

Also in this case, since the boss is integrated with the balance drive gears, it is possible to reduce the number of parts, whereby the cost reduction for the engine can be realized.

The above and other features and advantages of this invention will become apparent, and the invention itself will best be understood, from a study of the following description and appended claims, with reference had to the attached drawings showing a preferred embodiment of the invention.

BRIEF DESCRIPTION OF THE DRAWINGS

FIG. 3 is a compound schematic view along the sectional view III—III in a direction indicated by the arrow A in FIG. 4; FIG. 3 is a compound schematic in that it illustrates both a partial internal view and partial external of the three-cylinder and two-cycle engine in accordance with an embodiment of the present invention without exhaust-gas discharging unit 21 and air suction unit 26;

DESCRIPTION OF THE PREFERRED EMBODIMENT

Embodiments of the present invention will be described with reference to the drawings.

Figure 3:
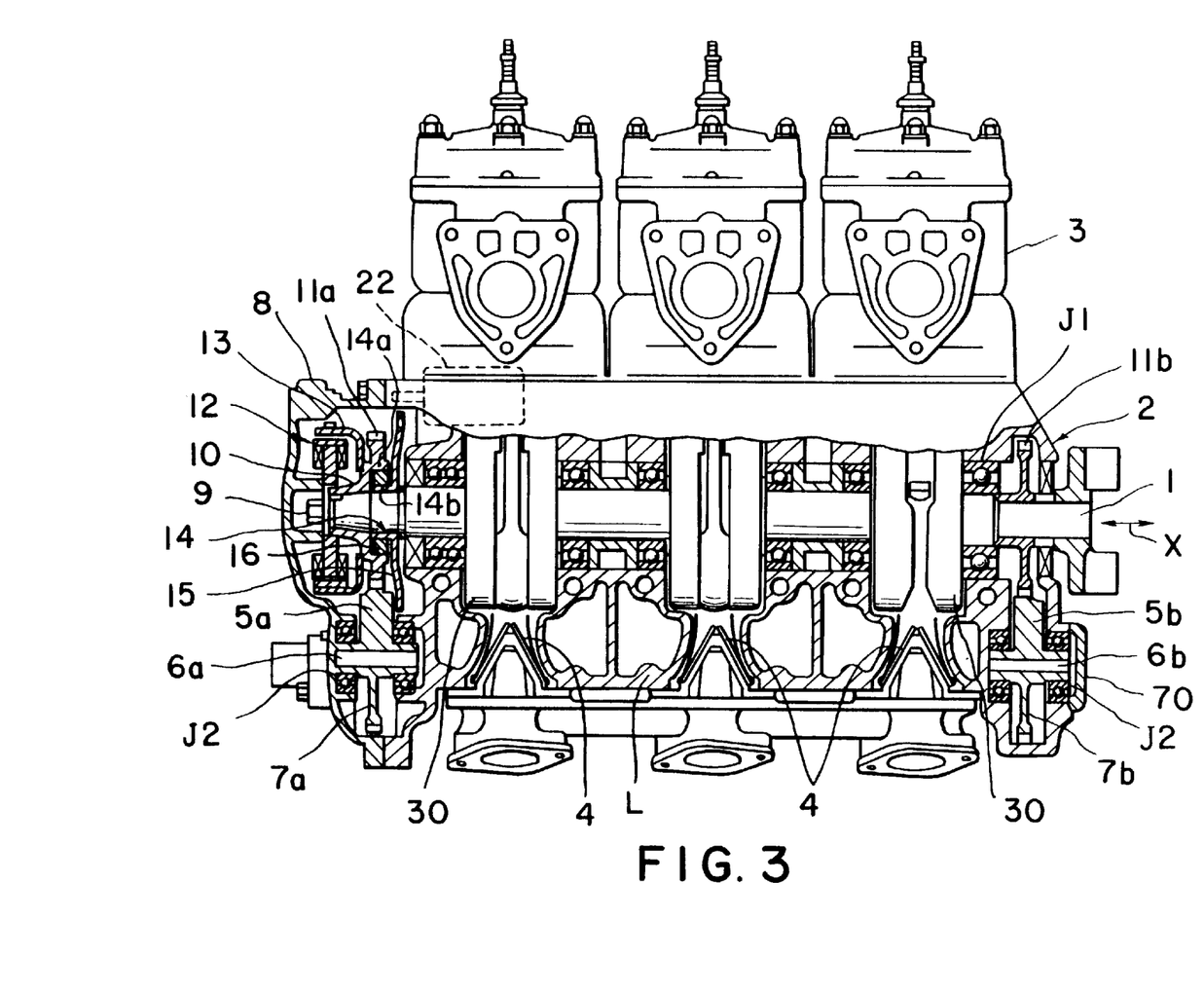
Figure 4:
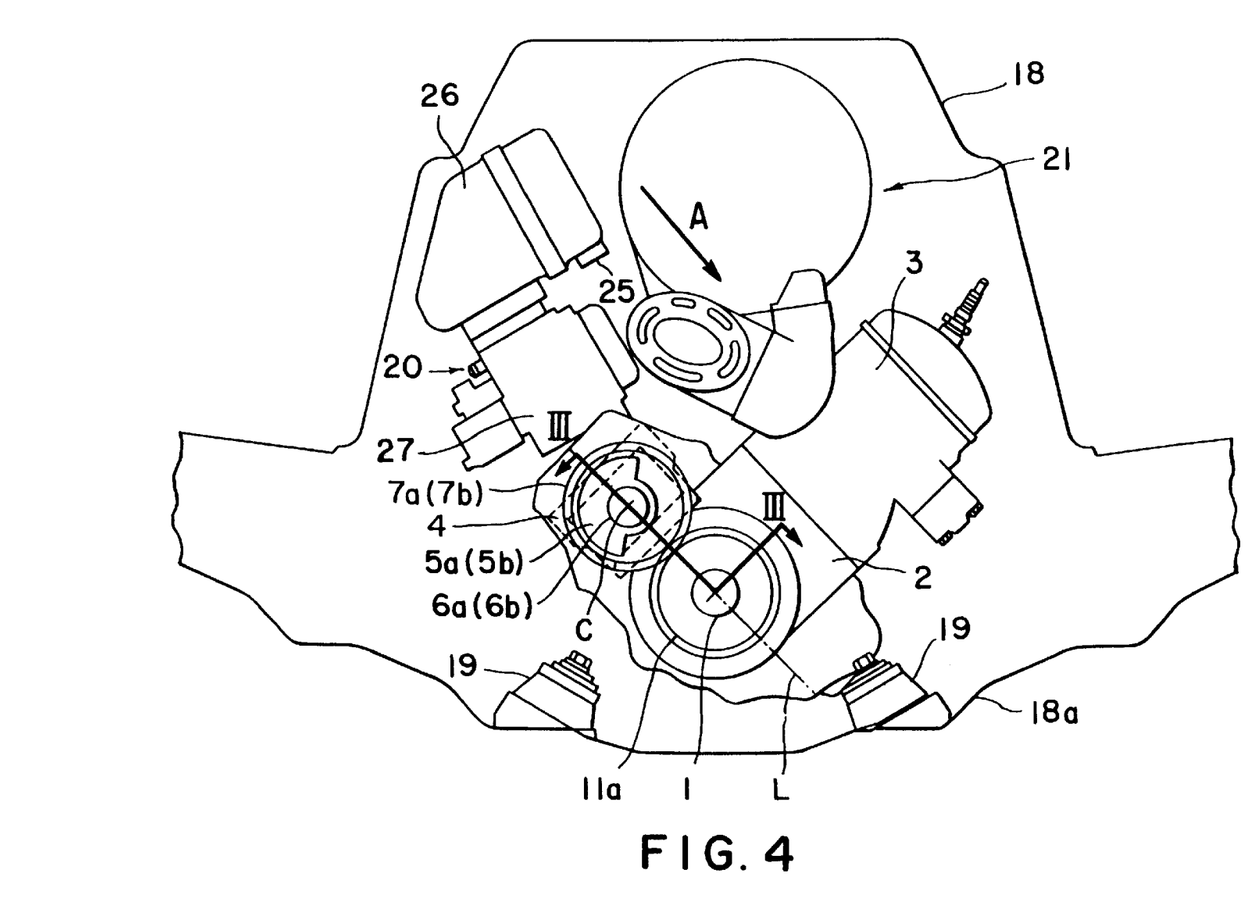
FIG. 4 is a schematic front view of a personal watercraft, showing a mounting arrangement of the crank shaft and the balance shaft in the two-cycle engine of the embodiment.

FIG. 3 shows a longitudinal cross section of the three-cylinder and two-cycle engine in accordance with the first embodiment of the present invention and FIG. 4 is a front view of a personal watercraft having the above engine on board.

In FIGS. 3, 4 the two-cycle engine includes a crank shaft 1 to which not-shown pistons reciprocating in cylinders 3 are linked. The crank shaft 1 is rotatably supported by a crank case 2 through bearings J1 disposed on opposing parting planes L of the crank case 2. The parting plane L is formed such a way that the parting plane L contains an axis of the crank shaft 1 and is substantially perpendicular to the axes of the cylinder 3. Corresponding to the respective cylinders 3, three intake reed valves 4 are juxtaposed in the axial direction X of the crank shaft 1. In order to prevent the intake air from blowing back from the crank case 2, the intake reed valves 4 are arranged in respective intake passages for introducing the intake air into the crank case 2. Being arranged so as to radially oppose a pair of crank webs 30 fixed on the crank shaft 1, each intake reed valve 4 operates to introduce the intake air into the crank case 2 through a clearance between the pair of the crank webs 30, 30. As shown in FIG. 4, each of the intake reed valves 4 is positioned so that a substantial center portion thereof viewed in the axial direction X of the crank shaft 1 is on the parting planes L.

As shown in FIGS. 3, 4 the two-cycle engine includes two balance weights 5a, 5b for reducing vibrations of the engine caused by the reciprocating motion of the pistons. The balance weights 5a, 5b are integrally provided with balance rotating shafts 6a, 6b for bearing them and driven gears 7a, 7b, respectively. These balance weights 5a, 5b are arranged outside the outermost intake reed valves 4, 4 on both sides of the crank case 2 and outside the outermost crank webs 30, 30 of the outside cylinders. In parallel with the crank shaft 1, the first balance weight 5a is rotatably supported, at both front and rear sides of the first balance shaft 6a in the axial direction, by a pair of bearings J2 which are supported by the crank case 2 and a cover 8 covering the end face of the crank case 2, respectively. Similarly, in parallel with the crank shaft 1, the second balance weight 5b is rotatably supported, at both front and rear sides of the second balance shaft 6b in the axial direction, by a pair of bearings J2 which are supported by the crank case 2. Note, the bearings J2 for the second balance weight 5b are also covered with a cover 70. In operation, the first balance weight 5a is driven by a drive gear 11a which is formed integrally with a boss 10 fixed on an end of the crank shaft 1 through a bolt 9. While, the second balance weight 5b is driven by a drive gear 11b fixed on the other end of the crank shaft 1. Further, the balance weights 5a, 5b are arranged in a manner that the rotating shafts 5a, 5b are on the parting planes L of the crank case 2.

A rotor 13 of a generator 12 is attached to the boss 10. Formed in integral with the boss 10 is an outer ring 14a of a one-way clutch 14 which includes an inner ring 14b rotatably attached to the crank shaft 1. Further, a starting drive gear 15 is formed integrally with the inner ring 14b of the one-way clutch 14. The starting drive gear 15 is driven by a starting motor 22 through not-shown reduction gears. As a further constituent of the one-way clutch 14, a clutch element 16 is interposed between the inner ring 14b and the outer ring 14a. In order to start the engine, the crank shaft 1 is firstly driven by the starting motor 22 through the starting drive gear 15 and the one-way clutch 14. Sequentially, when the rotating speed of the crank shaft 1 exceeds a predetermined rotating speed, the engagement of the clutch element 16 is released.

In assembling, the crank shaft 1, the intake reed valves 4 and the balance weights 5a, 5b are assembled in the crank case 2 while it is divided into two pieces by the parting planes L. Thereafter, the pieces are overlaid with each other on the parting planes L and integrated into one body by fastening bolts, so that the crank case 2 can be completed.

In the above-mentioned structure, since the balance weights 5a, 5b are arranged further outside the outermost intake reed valves 4, 4 on the parting planes L of the crank case 2, the intake reed valves 4, 4 overlap with the balance weights 5a, 5b in view of the axial direction X of the crank shaft 1. Accordingly, in the same view, a portion of the crank case 2 of the two-cycle engine projecting laterally becomes much smaller.

In addition, the balance rotating shafts 6a, 6b are also arranged further outside the outermost intake reed valves 4, 4. Thus, since the balance rotating shafts 6a, 6b do not extend to the inside of the outermost intake reed valves 4, 4, the arrangement allows the balance weights 5a, 5b to be supported without lengthening the shafts 6a, 6b. Further, as shown in FIG. 4, since the axes of the balance rotating shafts 6a, 6b are disposed on the opposing parting planes L, it is possible to construct the crank case 2 with the single parting plane, thereby simplifying the structure.

Although the above-mentioned embodiment is concerned with the three-cylinder and two-cycle engine, the present invention may be applicable to a single cylinder and two-cycle engine having a plurality of balance weights (ref. the specification of U.S. Pat. No. 3,903,995), of course. That is, by installing the intake reed valve in the crank case in a manner that the substantial center portion of the valve is on the parting plane of the crank case and arranging the balance weights and the cooperating balance rotating shafts so as to be distant from the intake reed valve in the axial direction X of the crank shaft, it is possible to provide the two-cycle engine having a small portion of the crank case projecting laterally and the short balance rotating shafts.

Note, as shown in FIG. 4, the two-cycle engine is mounted on mounts 19, 19 provided on a bottom 18a of a hull 18 of the personal watercraft so that the axis of the crank shaft 1 coincides with the front and rear directions of the hull 18. The personal watercraft, which may be a watercraft for leisure use, includes the engine arranged in the middle of the hull 18 in the front and rear directions of the watercraft, for driving a water jet pump (not shown) on the rear side. In this two-cycle engine, the cylinders 3 are arranged so as to extend from the axis of the crank shaft 1 obliquely upward on one lateral side while the intake reed valves 4 and an intake-air induction unit 20 are arranged so as to extend from the axis of the crank shaft 1 obliquely upward on the other lateral side, providing a V-shaped configuration of the engine. The intake-air induction unit 20 includes an air suction unit 26 for introducing fresh air through an inlet 25 provided with a water trapping mechanism to direct obliquely downward and a carburetor 27. Between the unit 20 and the cylinders 3, an exhaust-gas discharging unit 21 is arranged to have an exhaust-gas manifold, a muffler and so on. Different from the conventional engine, the two-cycle engine of the embodiment exhibits a compact V-shaped configuration since the balance weights do not project laterally of the crank case 2 in view of the axial direction X of the crank shaft. Therefore, the engine of the invention can be accommodated within the personal watercraft having the generally V-shaped bottom 18a, easily.

Figure 5:
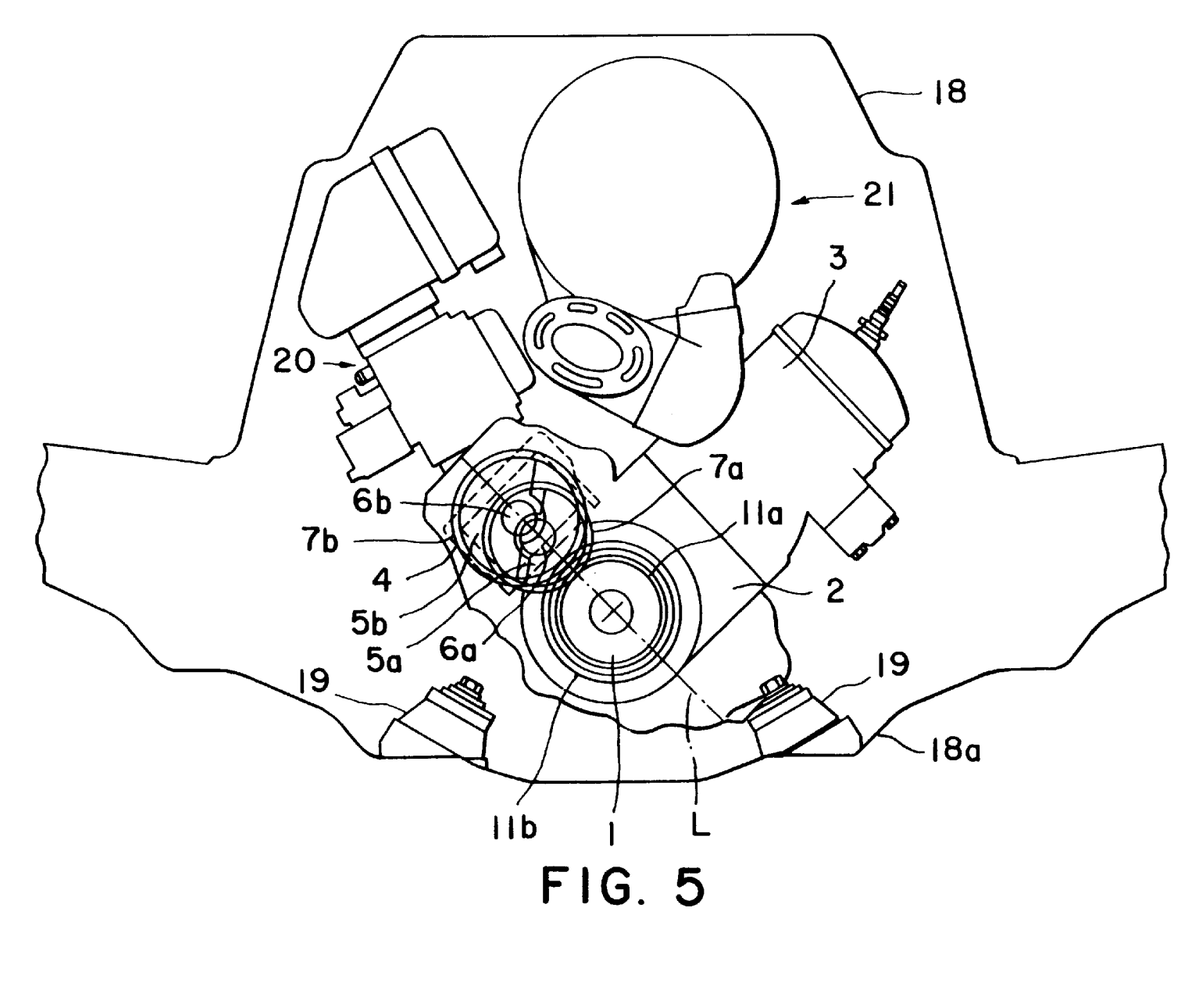
FIG. 5 is a schematic front view of a personal watercraft, showing a mounting arrangement of the crank shaft and the balance shaft in the two-cycle engine in accordance with another embodiment of the present invention.

FIG. 5 is a front view of the watercraft, showing the arrangement of the two-cycle engine in accordance with another embodiment of the invention. Note, in the embodiment, a longitudinal cross sectional view of the engine is not prepared because of its similarity to FIG. 3. FIG. 5 further shows the arrangement of the balance weights 5a, 5b in case of decreasing a diameter of the rotor 13 of the generator 12 of FIG. 3. In the arrangement, with the reduction of the diameter of the rotor 13, a diameter of the balance drive gear 11a formed integrally with the boss 10 is reduced and correspondingly, the meshing balance weight 5a is shifted close to the axis of the crank shaft 1 along the parting planes L, as shown in FIG. 5. Note, similarly to the previously-mentioned embodiment, the other balance weight shaft 5b is driven for rotation by the balance drive gear 11b fixed on the crank shaft 1.

According to the embodiment, since the respective positions of the balance weights 5a, 5b are shifted along the parting planes L of the crank case 2 towards the crank shaft 1 in the radial direction of the crank shaft 1 in correspondence with the diameters of the balance drive gears 11a, 11b, it is possible to establish the positions of the balance weights 5a, 5b appropriately in accordance with the diameters of the gears 11a, 11b while restricting the crank case 2 from protruding laterally.

Figure 6:
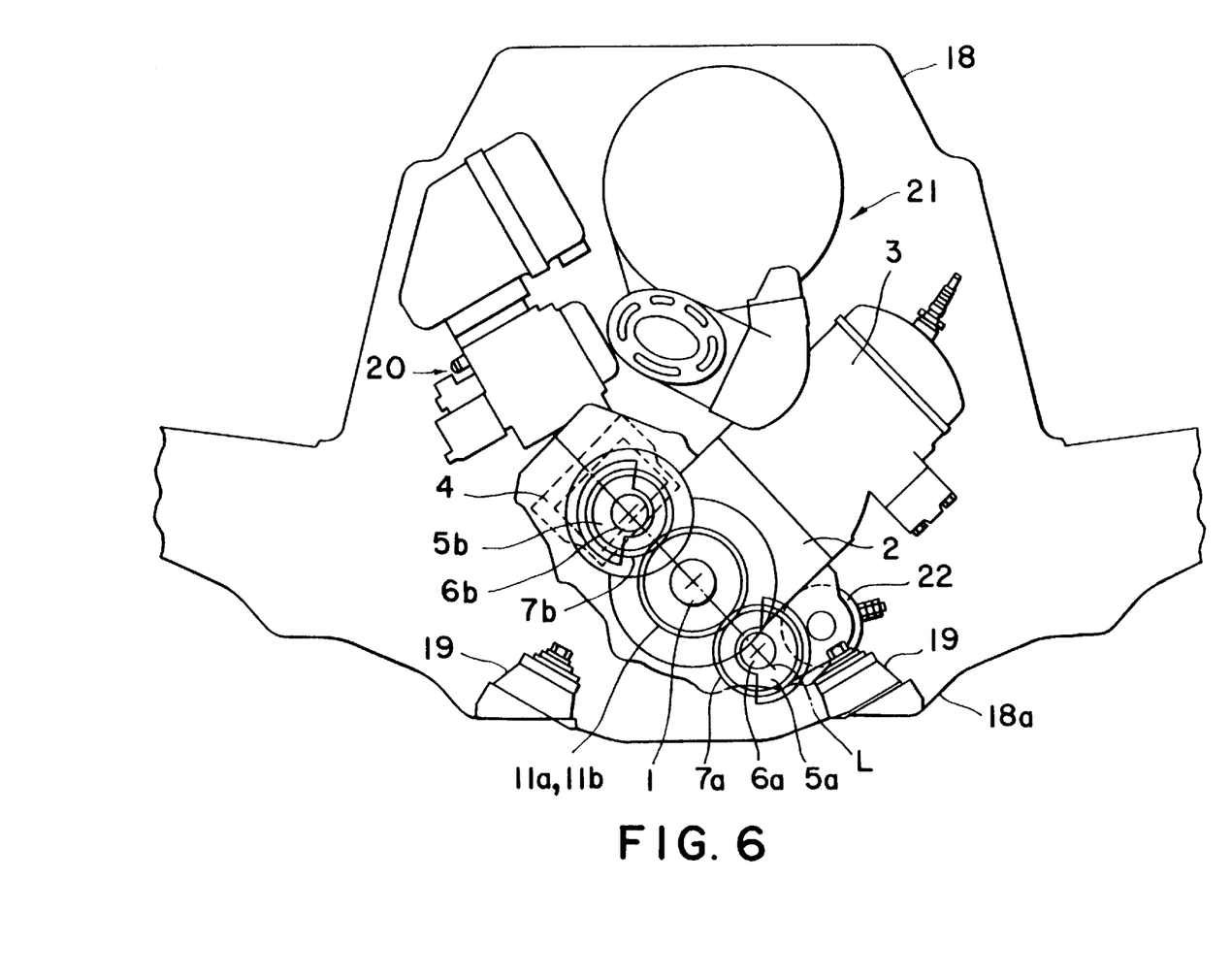
FIG. 6 is a schematic front view of a personal watercraft showing a mounting arrangement of the crankshaft and the balance shaft in the two-cycle engine in accordance with the other embodiment of the present invention.

FIG. 6 is a front view of the watercraft, showing the arrangement of the two-cycle engine in accordance with the other embodiment of the invention. Also in this embodiment, a longitudinal cross sectional view of the engine is not prepared because of its similarity to FIG. 3. FIG. 6 further shows the arrangement of the balance weights 5a, 5b in case that the intake reed valves 4 and the starting motor 22 between which the crank shaft 1 is interposed are positioned on both sides of the crank case 2. In detail, the intake reed valves 4 are arranged on the parting planes L in the crank case 2 supporting the crank shaft 1, while the balance weight 5b is arranged apart from the intake reed valves 4 in the axial direction X on the parting planes L similarly to the embodiment of FIG. 3 and driven by the balance drive gear 11b fixed on the crank shaft 1. Being arranged on the parting planes L and arranged apart from the starting motor 22 of FIG. 6 in the axial direction X of the crank shaft 1, the balance weight 5a is driven by the balance drive gear 11a formed integrally with the boss 10 fixed on the crank shaft 1 of FIG. 3.

According to the embodiment, since the balance weights 5a, 5b are arranged so as to interpose the crank shaft 1 of the FIG. 6 therebetween and overlap with the intake reed valves 4 and the starting motor 22 in view of the axial direction X of the crank shaft 1, respectively, it is possible to reduce a portion of the crank case 2 protruding laterally in view of the axial direction X, whereby the miniaturization of the two-cycle engine can be realized.

Finally, it will be understood by those skilled in the art that the foregoing description is preferred embodiments of the two-cycle engine and the personal watercraft with it, and that various changes and modifications may be made to the present invention without departing from the spirit and scope thereof.

What is claimed is:

1. A two-cycle engine comprising:
   a crank case;
   a crank shaft supported by said crank case so as to rotate therein;
   at least one cylinder provided at said crank case;
   at least one intake reed valve provided at said crank case radially apart from said crank shaft;
   a pair of balance rotating shafts provided at said crank case in parallel to said crank shaft; and
   a pair of balance weights supported by said balance rotating shafts, said balance weights arranged apart from and on both sides of said intake reed valve in an axial direction of said crank shaft in such a way that said pair of balance weights and said intake reed valve overlap each other in a view of an axial direction of said crank shaft, said balance weights adapted so as to rotate in association with said crank shaft.

2. A two-cycle engine as claimed in claim 1, wherein a plurality of said cylinders being juxtaposed in the axial direction of said crank shaft, a plurality of said intake reed valves being juxtaposed in the axial direction of said crank shaft in correspondence with said cylinders respectively, and a pair of said balance weights and a pair of said balance rotating shafts being arranged on both sides of said intake reed valves in an axial direction of said crank shaft.

3. A two-cycle engine as claimed in claim 1, wherein said intake reed valve is arranged at the interior of said crank case, and wherein said intake read valve, said balance rotating shafts and said crank shaft are arranged on a parting plane of said crank case in such a way that axial directions of said intake reed valve, said balance rotating shafts and said crank shaft are along said parting plane.

4. A two-cycle engine as claimed in claim 2, wherein said pair of balance weights are arranged along said crank case in such a way that a distance between one balance weight of the pair of balance weights and said crank shaft is different from a distance between an other balance weight of the pair of balance weights and said crank shaft.

5. A two-cycle engine as claimed in claim 2, further comprising a boss attached to said crank shaft for supporting a rotor of a generator, wherein said boss is provided with a drive gear for driving one of said balance weights.

6. A two-cycle engine comprising:
   a crank case;

a crank shaft supported by said crank case so as to rotate therein;

a cylinder provided at said crank case;

an intake reed valve provided at said crank case radially apart from said crank shaft;

a starter provided at said crank case radially apart from said crank shaft, said starter and said intake reed valve being on opposite sides of said crank shaft;

first and second balance rotating shafts provided at said crank case in parallel to said crank shaft; and first and second balance weights supported by said first and second balance rotating shafts respectively, and adapted so as to rotate in association with said crank shaft;

wherein said first balance weight is arranged apart from said intake reed valve in the axial direction of said crank shaft in such a way that said first balance weight and said intake reed valve overlap each other in a view of an axial direction of said crank shaft, and said second balance weight is arranged apart from said starter in the axial direction of said crank shaft in such a way that said second balance weight and said starter overlap each other in a view of an axial direction of said crank shaft.

7. A two-cycle engine as claimed in claim 6, wherein said intake reed valve is arranged at the interior of said crank case, and wherein said intake reed valve, said balance rotating shafts and said crank shafts are arranged on a parting plane of said crank case in such a way that axial directions of said intake reed valve, said balance rotating shafts and said crank shaft are along said parting plane.

8. A two-cycle engine as claimed in claim 6, further comprising a boss attached to said crank shaft for supporting a rotor of a generator, wherein said boss is provided with a drive gear for driving one of said first and second balance weights.

9. A personal watercraft comprising: a hull; and a two-cycle engine installed in said hull, said two-cycle engine including:

a crank case;

a crank shaft supported by said crank case so as to rotate therein;

an intake reed valve provided at said crank case radially apart from said crank shaft;

a pair of balance rotating shafts provided at said crank case in parallel to said crank shaft; and a pair of balance weights supported by said balance rotating shaft, said balance weights arranged apart from and on both sides of said intake reed valve in an axial direction of said crank shaft in such a way that said pair of balance weights and said intake reed valve overlap each other in a view of an axial direction of said crank shaft, said balance weights adapted so as to rotate in association with said crank shaft;

a cylinder mounted on said crank case and extending apart from an axis of said crank shaft obliquely upward on one lateral side of said crank shaft in view of the axial direction of said crank shaft; and an intake air induction unit together with said intake reed valve arranged and extending apart from said axis of said crank shaft obliquely upward on the other lateral side of said crank shaft in view of the axial direction of said crank shaft.

10. A personal watercraft as claimed in claim 9, wherein said two-cycle engine further includes a boss attached to said crank shaft for supporting a rotor of a generator, said boss being provided with a drive gear for driving one of said balance weights.

11. A personal watercraft comprising: a hull and a two-cycle engine installed ins aid hull, said two-cycle engine including:

a crank case;

a crank shaft supported by said crank case so as to rotate therein;

an intake reed valve provided at said crank case radially apart from said crank shaft;

a starter provided at said crank case radially apart from said crank shaft, said starter and said intake reed valve being on opposite sides of said crank shaft;

first and second balance rotating shafts provided at said crank case in parallel to said crank shaft;

first and second balance weights supported by said balance rotating shaft respectively, and adapted so as to rotate in association with said crank shaft, wherein said first balance weight is arranged apart from said intake reed valve in the axial direction of said crank shaft, in such a way that said first balance weight and said intake reed valve overlap each other in a view of an axial direction of said crank shaft, and said second balance weight is arranged apart from said starter in the axial direction of said crank shaft, in such a way that said second balance weight and said starter overlap each other in a view of an axial direction of said crank shaft;

a cylinder mounted on said crank case and extending from an axis of said crank shaft obliquely upward on one lateral side of said crank shaft in view of the axial direction of said crank shaft; and an intake air induction unit together with said intake reed valve arranged and extending from the axis of said crank shaft obliquely upward on the other lateral side of said crank shaft in view of the axial direction of said crank shaft.

12. A personal watercraft as claimed in claim 11, wherein said two-cycle engine further includes a boss attached to said crank shaft for supporting a rotor of a generator, said boss being provided with a drive gear for driving one of said balance weights.

* * * * *